US011574238B2

(12) United States Patent
Saha et al.

(10) Patent No.: US 11,574,238 B2
(45) Date of Patent: Feb. 7, 2023

(54) MACHINE LEARNING (ML)-BASED AUTO-VISUALIZATION OF PLANT ASSETS

(71) Applicant: ACCENTURE GLOBAL SOLUTIONS LIMITED, Dublin (IE)

(72) Inventors: Sudipta Saha, Bangalore (IN); Nithin Shetty, Mangalore (IN); Ayushman Chatterjee, Mumbai (IN); Satish Krishtagouda Mariyappagoudar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 946 days.

(21) Appl. No.: 16/291,897

(22) Filed: Mar. 4, 2019

(65) Prior Publication Data

US 2020/0285988 A1 Sep. 10, 2020

(51) Int. Cl.
 *G06N 20/00* (2019.01)
 *G06N 5/04* (2006.01)
 (Continued)

(52) U.S. Cl.
 CPC ............. *G06N 20/00* (2019.01); *G06N 5/04* (2013.01); *G06T 11/206* (2013.01); *G06V 30/422* (2022.01); *G06N 20/10* (2019.01); *G06N 20/20* (2019.01); *G06V 2201/06* (2022.01)

(58) Field of Classification Search
 CPC .......... G06N 20/00; G06N 5/04; G06N 20/10; G06V 30/422; G06V 2201/06; G06T 11/206
 (Continued)

(56) References Cited

U.S. PATENT DOCUMENTS 10,319,094 B1 * 6/2019 Chen .................. G06N 3/08
2016/0087949 A1 * 3/2016 Deleeuw ............. H04W 12/50
                                                   713/170

(Continued)

FOREIGN PATENT DOCUMENTS

CN    109034222    12/2018
WO    2019/028269    2/2019

OTHER PUBLICATIONS

Senevirantne et al., "In-service inspection of static mechanical equipment on offshore oil and gas production plants: A decision support framework", 2012 IEEE International Conference on Industrial Engineering and Engineering Management, Dec. 10, 2012, pp. 85-90.

(Continued)

Primary Examiner — Hai Tao Sun
(74) Attorney, Agent, or Firm — Mannava & Kang, P.C.

(57) ABSTRACT

A machine learning (ML) based asset monitoring system that automatically determines damage mechanisms (DMs) and generates automatically updated visualizations of assets that include equipment and lines of a processing plant is disclosed. The asset monitoring system is communicatively coupled to the assets of the plant and continuously receives process parameters associated with the various processes and equipment in the plant. Corrosion loops (CLs) are identified and automatically demarcated by the asset monitoring system. DMs are predicted for each of the assets using a ML model based on the process parameters and the corrosion loops. The data regarding the DMs, CLs and the process parameters are used to obtain equipment risk rankings for the assets. Multi-dimensional visualizations of the assets that display the state of the plant assets in real-time are generated.

20 Claims, 12 Drawing Sheets

(51) Int. Cl.
  *G06T 11/20* (2006.01)
  *G06N 20/20* (2019.01)
  *G06N 20/10* (2019.01)
  *G06V 30/422* (2022.01)

(58) Field of Classification Search
  USPC .............................................. 701/11; 706/11
  See application file for complete search history.

(56) References Cited

U.S. PATENT DOCUMENTS

| | | |
|---|---|---|
| 2016/0375676 A1* | 12/2016 | Ritchie .................. B33Y 10/00 428/29 |
| 2018/0149580 A1 | 5/2018 | Vasan et al. |
| 2019/0033845 A1 | 1/2019 | Cella et al. |
| 2019/0095765 A1* | 3/2019 | Lim ...................... G06T 7/0006 |
| 2019/0164277 A1* | 5/2019 | Sasson .................. G06T 7/0004 |
| 2020/0005406 A1* | 1/2020 | Scharpf .................. G06N 20/00 |

OTHER PUBLICATIONS

Accenture, "Corrosion Management for Upstream Pipeline Network", Feb. 7, 2018, 1 page. Retrieved from the Internet: <URL:https://www.youtube.com/watch?v=ar3RixLZnK0>.

Rachman Andika et al., "Implementation of lean knowledge work in oil and gas industry—a case study from a Risk-Based Inspection project", 2016 IEEE International Conference on Industrial Engineering and Engineering Management (IEEM), Dec. 4, 2016, pp. 675-680.

* cited by examiner

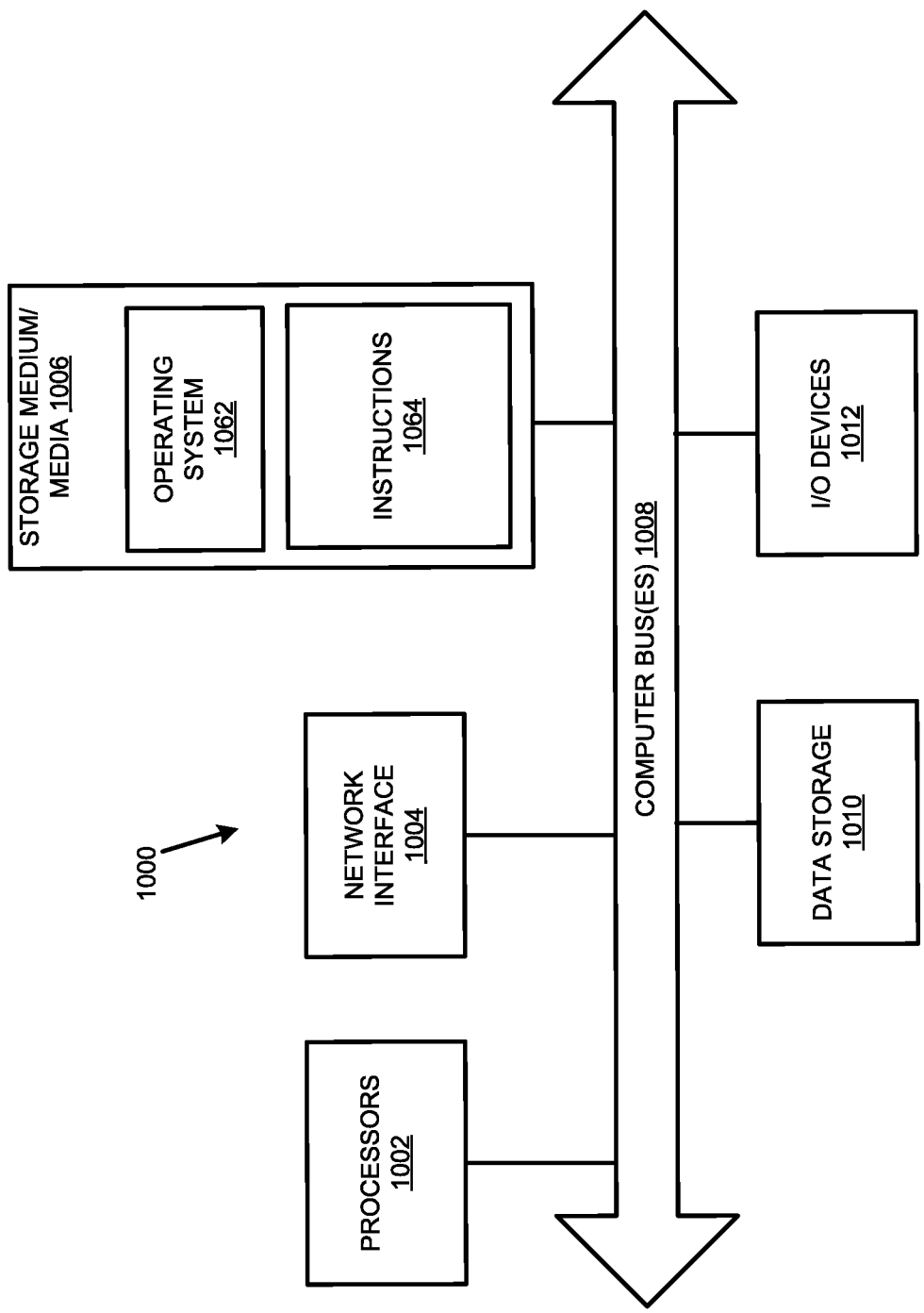

MACHINE LEARNING (ML)-BASED AUTO-VISUALIZATION OF PLANT ASSETS

BACKGROUND

Process engineering plants like refineries, power plants, chemical plants etc. include a variety of equipment that spans hundreds or even thousands of assets. These assets undergo varied levels of corrosion and degradation based on the dynamic nature of the production process. The productivity of these plants is greatly impacted due to the corrosion and degradation of these assets, often leading to unplanned downtime. Organizations have to adopt expensive strategies to reduce the downtime, increase the life of the assets and thereby increase productivity of these plants. However, the reliability of these strategies largely depends on the quality of the associated data which resides in disparate systems and the ability of the engineers to build a good model out of it. Quite often these strategies can only determine the damage to the equipment when it becomes evident, thereby making these techniques unreliable.

BRIEF DESCRIPTION OF DRAWINGS

Features of the present disclosure are illustrated by way of examples shown in the following figures. In the following figures, like numerals indicate like elements, in which:

FIG. 10 illustrates a computer system that may be used to implement the asset monitoring system in accordance with examples disclosed herein.

DETAILED DESCRIPTION

Figure 1:
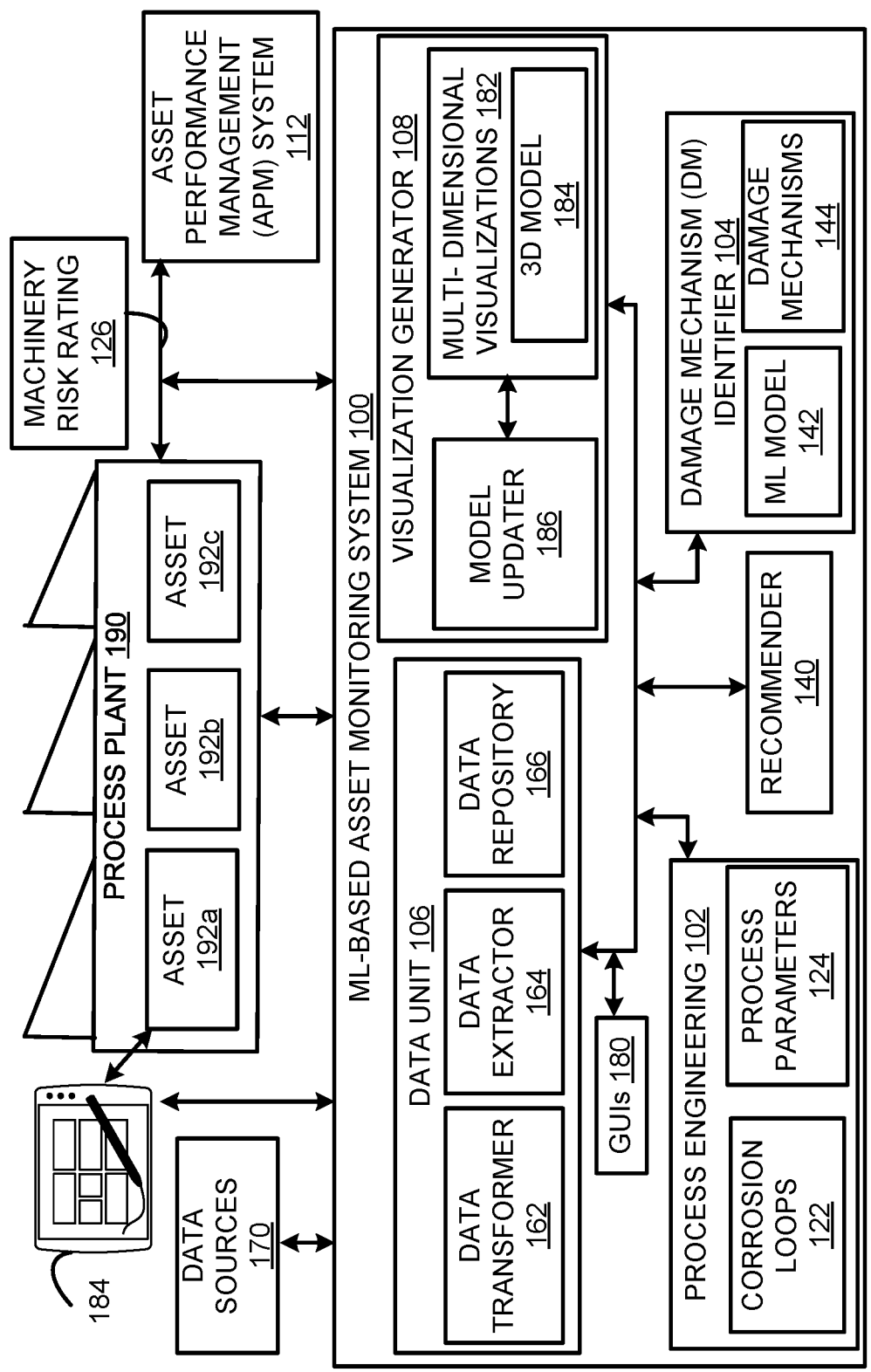
FIG. 1 is a block diagram that shows the details of an ML-based asset monitoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A machine-learning (ML) based asset monitoring system disclosed herein automatically identifies corrosion loops (CLs) and determines damage mechanisms (DMs) for assets in a process plant using AI based models, extracts engineering information from various systems like process engineering system, 3D model and external systems as required by the asset performance management (APM) system, automatically synchronizes with the APM system for risk ranking and generates multidimensional visualizations that reflect current statuses of the assets in real-time. The assets in the process plant can include various lines and equipment used for various processes to produce an output material. The asset monitoring system includes a data-centric process engineering (PE) system that contains two-dimensional representations of the plant equipment such as intelligent process and instrumentation diagrams (P&ID) that include relevant process data required for asset performance management. The data within the PE system generally includes design data such as design pressure, design temperature, fluid service including the type of fluid carried within the pipelines e.g., water, oil etc. wherein the design pressure, design temperature etc. correspond to predetermined values that are preset for the performance of the processes. The PE system initially enables manual or automatic identification of corrosion loops (CLs). A corrosion loop can include a section of one or more assets that share common or similar attributes including functioning under similar process conditions. Generally, assets which execute a particular sub-process, or that share common DM susceptibilities with similar anticipated rates of damage can be included in one CL. A CL can typically be comprised of assets made of similar materials exposed to similar processes/environmental conditions and asset characteristics. On identifying the various CLs in a P&ID either via manual or automatic identification processes, the PE system automatically demarcates the various CLs. In addition, the data identifying the specific CL is added for each of the assets in the PE system. PE system also provides the ability to visualize the plant assets based on the corrosion loops or by damage mechanisms using a specified color coding.

The information regarding the CLs and process parameters provided by the PE system is used for automatic identification of DMs using a ML-based model. The process parameters can include name-value pairs of the various environmental conditions at the different assets during the processes. In addition, industry standard information pertinent to the domain associated with the plant may also be accessed for the prediction of DMs. For example, in the case of oil refineries, standard information such as American Petroleum Institute (API) is accessed for the identification of the DM. A DM can include a cause of problems or failures within process equipment. DMs or degradation mechanisms can include corrosion, cracking, heat damage, etc. The ML model used for predicting the DM is trained on historical data collected during the course of the plant operations. The historical data can include labelled data with the various process parameters and the corresponding DMs identified for each asset. Algorithms such as but not limited to support vector machines (SVMs) or random forests can be implemented by the ML model.

The information regarding the CLs, the DMs, the process parameters, etc. is supplied to an asset performance management (APM) system for the estimation of an equipment risk ranking for each of the assets. The equipment risk ranking provides an estimate of the likelihood of failure of the asset. In an example, a lower risk ranking, e.g., risk rank of '1', can signify an asset which is in the danger of imminent failure while a higher risk ranking may signify a safer equipment. In an example, the scale may be reversed so that a lower number signifies a lower risk while a higher risk ranking number signifies greater risk of failure. The equipment risk ranking from the APM system can be communicated back to the asset monitoring system for display in the visualizations of the assets. The equipment risk ranking from the APM systems can be used to plot inspection priority based on the consequence of failure and probability of failure. The risk values are automatically communicated back to the asset monitoring system for display in the visualizations of the assets.

Various multi-dimensional visualizations can be generated to display the current state of the assets. In an example, the asset monitoring system can generate corrosion isometric drawings that enable remote performance management of the plant assets. The information from the PE system, CLs and the associated damage mechanisms is passed on to a 3D model. The 3D model carries additional information such as physical dimensions of the assets, physical location, material grade etc. which are required to perform the risk ranking analysis in the APM system. Thickness monitoring locations (TMLs) are also marked in the 3D model. The real time thickness values can then be represented for each of these assets. 3D Model provides the ability to visualize the plant and the assets in a 3D view based on the corrosion loops, damage mechanism or the thickness values.

The information from the PE system and the 3D model is then supplied to the APM systems through a data unit, which validates, transforms and automatically loads the data to the APM system. The data unit also enables data extraction from the external engineering documents. Any change in the data in any of the plant assets is automatically updated to the APM system. The 2D representations can include P&ID while three dimensional (3D) representations can include 3D models. The 3D models form a digital twin of the plant which can be viewed in the mobile device. As the visualizations are communicatively coupled to other elements of the asset monitoring system, the information from other elements such as the CLs, the DMs or the equipment risk ranking can be displayed within the visualizations. In an example, the equipment risk ranking can be associated with the criticality of the asset wherein lower value of equipment risk ranking translates to greater criticality or greater probability of failure of the asset. A red, orange and green color scheme can be implemented to convey the asset criticality within the visualizations. The red color can indicate a highly critical asset with high probability of failure, orange can indicate an asset with a fairly highly probability of failure while green indicates an asset functioning normally. The asset monitoring system therefore provides a visual representation of DM based on the information from the PE system. Moreover, the visualizations enable identifying thickness monitoring locations (TMLs) and thickness values are populated within the visualizations. TMLs are designated locations on pressure vessels and piping where thickness measurement inspections (TMIs) are conducted to monitor the presence and rate of damage and corrosion.

A majority of plants in operation today continue to employ reactive, break-fix, maintenance plans rather than using predictive strategies. Many of the activities for asset performance management such as identifying CLs, DMs, etc. are done manually as a result of which the determination of asset life depends largely on the crew dealing with the equipment. The output of such decisions largely impacts the reliability analysis of the assets. The asset management systems that are currently in use do not take advantage of the latest artificial intelligence (AI) techniques and are therefore, not self-learning. Moreover visualizations that reflect real-time statuses of the plant assets are also not provided. Also, the intelligence regarding asset reliability and factors affecting the asset reliability tend to be localized to a specific project or plant. Additionally, the data required for managing the plant assets is generally stored in multiple sources. In the absence of a single source of information, collection of data from the multiple sources can be very cumbersome thereby making the predictions based on such disparately stored data unreliable and inaccurate. The opportunities for insights that can be gained by correlating data from different sources are lost.

The asset monitoring system can extract engineering data for a plant from the Engineering Information Management (EIM) solutions and operate as the master for tracking information on capital assets into a single source of DMs, such as a single data repository in order to implement a reliable asset performance management program. Data from different parts of the asset performance management systems are transformed into a standardized format and stored at a data repository. Moreover, the asset monitoring system disclosed herein can utilize the latest AI/ML techniques to enable technical improvements in asset performance management systems. The ML model used for DM prediction is trained on historical data and the trained ML model is used to determine DMs within plant assets. Therefore, the ML model can be trained on the unique insights that are gained from collating data from the various asset performance management systems that have heretofore remained disparate and unconnected. Such automatic determination of DMs also enables detection of vulnerabilities or potential failures within the plant assets in advance of their actual occurrence. As a result, a proactive maintenance routine which prevents equipment failures can be implemented as opposed to reactive maintenance activities that are carried out after the equipment failure occurs. The asset monitoring system provides a unique platform to enable integrating disparate systems within the organization (engineering, maintenance, operations) resulting in end-to-end visibility of asset data for improved enhanced productivity, assets integrity and reliability, reduced asset ownership and runtime costs and improved regulatory compliance. Moreover, performance of damage mechanism reviews (DMRs) to determine credible degradation modes and susceptibilities of processing equipment is an important step in developing effective mechanical integrity plans for industries such as refineries and chemical processing plants.

FIG. 1 is a block diagram that shows the details of the ML-based asset monitoring system 100 in accordance with the examples disclosed herein. The asset monitoring system 100 monitors assets 192*a*, 192*b*, 192*c*, etc. such as the various equipment in a process plant 190. It can be appreciated that only three assets are shown for brevity and that the process plant 190 can indeed contain hundreds or even thousands of assets which are monitored by the asset monitoring system 100 in accordance with the examples disclosed herein. The asset monitoring system 100 can be physically located within the process plant 190 or can be located remotely from the process plant 190 and connected to the process plant 190 via a wireless network such as the internet. Certain examples are discussed below with respect to oil and natural gas industry for illustration purposes. However, it can be appreciated that examples of process plants can also include plants or installations for processing chemicals, food processing units and the like. The asset monitoring system 100 enables to implement proactive maintenance procedures by generating multi-dimensional visualizations of the assets within a plant that may be functioning in any of the aforementioned example domains.

The asset monitoring system 100 includes a process engineering (PE) system 102, a damage mechanism (DM) identifier 104, a data unit 106 and a visualization generator 108. The asset monitoring system 100 can receive information regarding the assets from a large variety of data sources in different data formats. By way of illustration and not limitation, the information for executing various tasks within the asset monitoring system 100 can be obtained from a plurality of data sources 170 such as but not limited to physical documents that include design drawings of equipment, machine specification documents, details of the various processes, etc. in different formats such as scanned image files which may or may not be processor readable, spreadsheets, comma separated value (CSV) files, word processing documents, database tables or other proprietary formats that can be specific to certain applications. For example, the real-time data emitted by a sensor may be received directly in a format that is specific to that sensor. The data unit 106 can include a data transformer 162, a data extractor 164 and a data repository 166. The data transformer 162 can be configured to convert the data received from the various data sources into a standard format that can be processed by other elements of the asset monitoring system 100. The standardized data thus transformed can be saved to the data repository 166 for use by the asset monitoring system 100. The data extractor 164 can be configured to extract data from the data sources 170. Various data processing techniques such as but not limited to, pattern recognition, optical character recognition (OCR), natural language processing (NLP), etc. can be implemented to obtain the information from the data sources 170. The data extractor 164 can implement a zone based extraction of data for physical documents. The data thus extracted can be saved to the data repository 166. In an example, historical data associated with the plant 190 can also be saved. The historical data can be used to develop and train AI-based models such as a ML model 142 for use by the DM identifier 104 or an AI model for the automatic identification of CLs in accordance with the examples detailed herein.

The PE system 102 provides two-dimensional representations along with the relevant data required for monitoring each of the assets. The PE system 102 receives information regarding the corrosion loops (CLs) 122 and automatically highlights the CLs 122. The PE system 102 also enables gathering real-time process parameters 124 such as but not limited to, temperature, pressure, osmotic pressure, concentration of a liquid, viscosity and other attributes of the assets or the entities being processed by the various assets of the process plant 190. The process parameters 124 can be gathered using sensors that obtain real-time values of the aforementioned attributes. The process parameters 124 thus gathered can be used in identifying CLs 122 and the automatic determination of DMs for each of the assets 192a, 192b, etc. Moreover, the process parameters 124 also enable generating real-time multidimensional visualizations 182 that are representative of a current state of one or more of the assets 192a, 192b, etc. in the process plant 190. In an example, various GUIs 180 can be associated with the asset monitoring system 100 to receive input from users and to provide output to the users. For example, input identifying the CLs can be received via one or more of the GUIs 180. Similarly, the CLs marked up by the PE system 102, the various visualizations that are generated and other output can be provided by the GUIs 180. The GUIs 180 can include markup documents that can be displayed via browsers or UIs to be presented in mobile 'apps', etc. The two-dimensional visualizations can be generated using SmartPlant P&ID while the 3D visualizations can be generated using SmartPlant 3D in accordance with some examples.

The DM identifier 104 receives the requisite data from one or more data sources to automatically identify a DM for each of the assets 192a, 192b, etc. by using a ML model 142. It may be noted that each asset may be associated with one or more DMs 144 based on the process and materials involved in the process. In an example, the one or more data sources can include the PE system 102 which provides the real-time process parameters 124. Another data source includes certain industry standard information such as but not limited to API 571 which is a recommended practice (RP) developed and published by the American Petroleum Institute (API) that provides an in-depth look at over sixty different DMs that can occur to process equipment in refineries. Examples of the types of DMs covered by API RP 571 include, but are not limited to, wet H2S cracking, reheat cracking, sulfuric acid corrosion, polythionic acid stress corrosion cracking, dissimilar metal weld (DMW) cracking, etc. It can be appreciated that the standard information received by the DM identifier 104 can depend on the domain associated with the plant 190. For example, if the plant pertains to a chemical factory then the industry standards for the DMs can be different than the industry standard information for oil processing received by the DM identifier 104.

In an example, the asset monitoring system 100 may also be communicatively coupled to an asset performance management (APM) system 112. In an example, the APM system 112 can be an external asset management system such as Meredium which can be used for calculating an equipment risk ranking 126 for the assets using proprietary formulae peculiar to the applications being used. The APM system 112 can be configured to receive the process parameters 124, the DMs 144, the information regarding the CLs 122, etc. For example, if the plant 190 pertains to processing oil, the equipment risk ranking 126 can be generated on conducting risk based inspection (RBI) analysis of the assets 192a-192c. The equipment risk ranking 126 can be a combination of the probability of failure (POF) and Consequence of Failure (COF). The equipment risk ranking 126 can be based on the attributes of the DM. For example, if the DM pertains to corrosion, then the equipment risk ranking 126 can be based on short-term corrosion rate, long-term corrosion rate, the number of inspection activities, etc. Upon identifying the CLs 122 and the DMs 144 for the assets, the master data setups for RBI pertaining to the assets 192a-192c including design data, operating data, etc. are fetched from the PE system 102 in order to obtain the equipment risk ranking 126. A recommendation for maintenance activities such as inspections can be generated based on values such as inspection priority calculated by the APM system 112. The inspection priority can be embedded into an inspection task and/or inspection strategy in accordance with some examples. In an example, the DMs in view of the equipment risk rankings enables identifying recommended maintenance actions by the recommender 140. The recommender 140 can determine the criticality of the asset based on the DM, the equipment risk ranking and identify one or more maintenance action(s) to recommend using, for example, the plurality of data sources 170 which can include product manuals, process documents and the domain-specific standard information such as API 571, etc.

The information from the different parts of the asset monitoring system 100 including the automatically-identified DM(s) associated with each of the assets 192a-192c is received by the visualization generator 108 that generates multi-dimensional visualizations 182. In an example, the multi-dimensional visualizations 182 can include two-dimensional (2D) or three-dimensional (3D) visualizations of the assets in the plant 190. In an example, the 3D visualizations of the assets can include a 3D model 184 of the process plant 190. Each asset of the process plant 190 can be represented within the 3D model 184 so that the 3D model 184 forms a 'digital twin' of the process plant 190. The visualization generator 108 can be communicatively coupled to other elements of the monitoring system 100 such as the PE system 102 via the data unit 106 that facilitates data exchange. Therefore, the data from the 3D model 184 can be transformed into a format usable by the PE system 102 and vice versa. The 3D model 184 provides the required information such as the physical dimensions of the assets, material grade etc. to the APM system 112

A model updater 186 is included in the visualization generator 108 so that the multi-dimensional visualizations 182 such as the 3D model 184 are updated with the current data from other elements of the monitoring system 100 such as the PE system 102. The multi-dimensional visualizations 182 such as the 3D model 184 can therefore, reflect not only the current process parameters but also the CLs based on the information from the PE system 102. By generating isometric corrosion drawings and enabling displays of the DMs and the TMLs, the visualization generator 108 reflects the current status of each of the assets 192a-192c. Attributes such as TMLs can be initially marked in the 3D model 184. The current status of each of the assets can reflect a risk of probability of failure (POF) of the asset due to the DM. The 3D model 184 therefore provides a visual representation of those locations where the rate of damage is high or critical. The multi-dimensional representations or the multi-dimensional visualizations of the assets can include color coding such as red, orange and green to indicate if the asset is in a critical state, an acceptable state or a good state respectively. An asset in a critical state may be shown in red in the multi-dimensional visualizations. Further, one or more actions or tasks for immediate implementation can be suggested to improve the status of the asset can be suggested by the APM system 112. An asset is in a non-critical state and yet requires certain maintenance action may be in a satisfactory status and displayed in orange in the multi-dimensional visualizations. One or more maintenance tasks that can be executed over a period of time can be suggested by the APM system 112. Finally, an asset in good condition can be displayed in green in the multi-dimensional visualizations. The APM system 112 may not suggest any tasks within a predetermined time period for such assets in acceptable conditions. Any changes in the equipment risk ranking of the assets can be transmitted to the visualization generator 108 and reflected in the visualizations generated for those assets in real-time. For example, upon completion of the suggested maintenance tasks, the color of an asset may be changed from red/orange to green automatically in real-time in the multi-dimensional visualizations. Such real-time updates enable remote inspections so that supervisors who may be remotely located can be assured of the completion of maintenance tasks at the plant 190 without having to physically inspect the asset.

In an example, the multi-dimensional visualizations 182 can be provided at remote user devices such as the tablet computer 184 using a browser, an 'app' or other widgets based on the information received at the asset monitoring system 100. For example, a bar code physically coupled to an asset, e.g., the asset 192a in the plant 190, can be scanned by a mobile device such as the tablet computer 184 and transmitted to the asset monitoring system 100. Based on the bar code, a multi-dimensional visualization, such as the 3D visualization, can be generated at another client device such as the augmented reality (AR) glasses which can be located at a geographical region that is remote from that of the plant 190.

Figure 2:
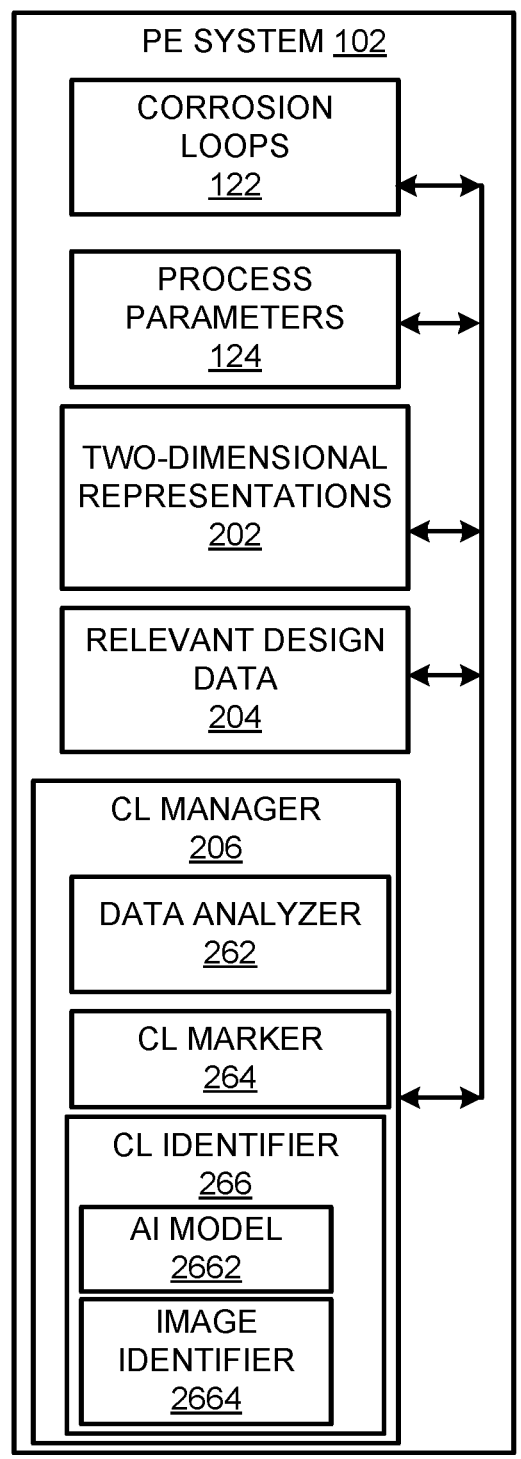
FIG. 2 shows a block diagram of a process engineering (PE) system in accordance with the examples disclosed herein.

FIG. 2 shows a block diagram of the PE system 102 in accordance with the examples disclosed herein. The PE system 102 is a data-centric system that has the data required for identifying CLs built into it. Accordingly, the PE system 102 includes two-dimensional (2D) representations 202 of the various assets within the plant 190. The 2D representations 202 can include, in some examples, process and instrumentation diagrams (P&IDs) along with the relevant data 204 including design data such as design temperature, pressure, fluid service etc. required for performing asset management. The relevant data 204 within the PE system 102 is generally design data that is used for identification of a DM or for asset performance management. As mentioned herein, the PE system 102 enables identification of CLs 122 and to automatically highlight the CLs 122. Accordingly, the PE system 102 includes a CL manager 206 which further includes a data analyzer 262 and a CL marker 264. In an example, the data analyzer 262 can receive from a user, the identity information regarding the CLs in a particular two-dimensional representation. Each line/equipment in the P&IDs can be evaluated by users and the CLs are identified based on the evaluation. The user can provide the CL number for each line or asset in one example.

The CL marker 264 can be configured to visually represent the assets based on the CLs. The PE system 102 being a data centric system has the ability to store information associated with a specific equipment in the process plant 190. Additional properties, if required, can also be added to each of this equipment to identify the CLs 122. An automated/manual process can be built into the PE system 102 which can identify the CLs 122 of each equipment/lines based on specific properties. For example, in a crude distillation unit, the line from a crude exchanger to the desalter may have similar properties and therefore can be identified as one of the CLs 122. Desalter can be another one of the CLs 122. Desalter to preflash exchanger could be the next CL and so on.

The automated process for CL identification can include the use of AI models. As mentioned above, assets within the process plant 190 with similar properties can form parts of a CL. The CL manager 206 includes a CL identifier 266 with an AI model 2662 trained on legacy data or historical data to identify assets from the plant with similar properties. Many process plants include paper documents from the data sources 170 or plant operational data stored in legacy data systems which can be used as model training data. For example, the AI models can be include support vector machines (SVMs), random forests etc. which can be trained, tested and the best performing AI model can be selected for use in the CL identifier 266. For example, if two of the assets in the process plant 190 are carrying similar kind of fluid under similar circumstances, then the AI model 2662 can correlate such information from the relevant design data 204 and suggest a CL including the two assets. In an example such suggested CLs can also be marked on the 2D representations 202. The image identifier 2664 can also include AI models trained to identify specific representations or symbols for the various assets used in the 2D representations. The CL marker 264 can automatically mark out the assets in particular colors as suggested CLs. The suggested CLs can be submitted for user validation. The user can confirm or delete the suggested CLs during the validation process.

In an example, the PE system 102 can also be configured to display the status information of the assets such as the asset's criticality based on the equipment risk ranking 126 generated by the APM system 112. The PE system 102 can also be configured to allow additional properties as required for the identification of the CLs. The information regarding the CLs 122 along with the properties is then passed on to the DM identifier 104. The DM that is computed using the ML model 142 can then be populated to each asset/line in order to be updated to the corresponding two-dimensional representations 202. The PE system 102 can be further communicatively coupled to the visualization generator 108 and the data unit 106 in order to facilitate information exchange in accordance with the examples disclosed herein.

Figure 3:
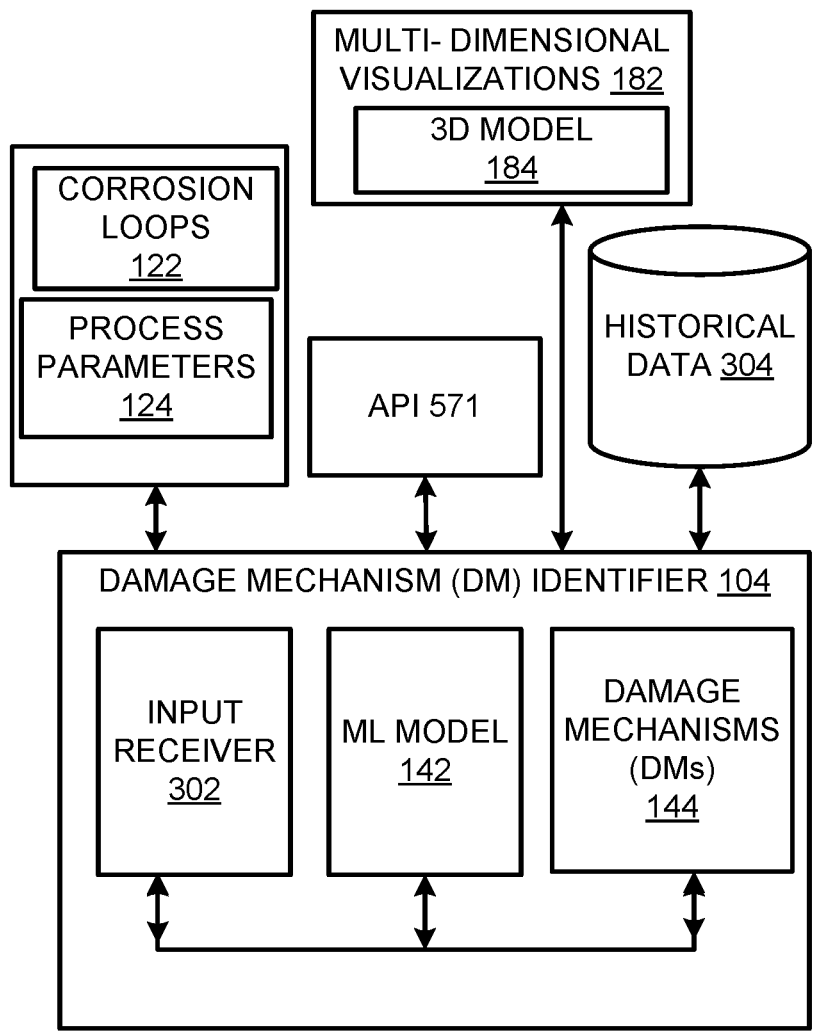
FIG. 3 shows a block diagram of a damage mechanism (DM) identifier in accordance with the examples disclosed herein.

FIG. 3 shows a block diagram of the DM identifier 104 in accordance with the examples disclosed herein. The DM identifier 104 includes an input receiver 302 to receive relevant data from the PE system 102, data unit 106 etc. such as the identified CLs 122 and the process parameters 124. In addition, the DM identifier 104 can also be configured to access industry standard information such as the API 571 when the plant 190 pertains to the oil industry in order to identify the DMs 144. Moreover, data from the multi-dimensional visualizations 182 such as the 3D model 184 can also be received at the DM identifier 104 for the identification of the DM. In an example, the input receiver 302 can receive standardized data from the PE system 102 and the industry standard information as required by the ML model 142. The transformed data can be consumed by the ML model 142 in predicting the DM for each of the assets.

The ML model 142 that is employed for the identification of the DM can be trained and tested on historical data 304. The historical data 304 can include labelled records wherein the DMs are identified for assets for specific process parameter values. For example, the historical data can be split randomly in the ratio of 80/20 for training and testing purposes. In addition, the historical data 304 can include references to the industry standard information. The DM data can be a combination of numerical and non-numerical (factor) data type i.e., a combination of float and classification data types. The ML model 142 can be implemented via 2 multiclass classifier algorithms for classification. In an example, support vector machines (SVMs) can be implemented for the ML model 142 for the prediction of the DM. In an example, random forests can be implemented for the prediction of the DM. The ML model 142 can predict the DM value for new parameter data based on the training from the historical data 304. The DMs 144 thus identified can be provided to the PE system 102 for associating the DMs to the CLs, etc. Moreover, the DMs are populated for each of the assets for proper representations with accurate color codes in the multi-dimensional visualizations 182. The DM identifier 104 in some examples can be implemented using R Analytics and Python platforms.

Figure 4:
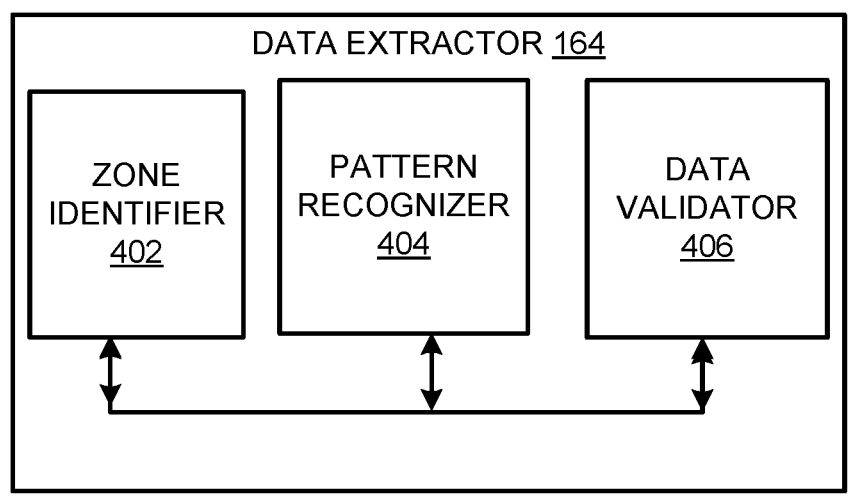
FIG. 4 shows a block diagram of a data extractor in accordance with the examples disclosed herein.

FIG. 4 shows a block diagram of the data extractor 164 in accordance with the examples disclosed herein. The data extractor 164 can include a zone identifier 402, a pattern recognizer 404 and a data validator 406. The PE system 102 or the visualizations provided by the visualization generator 108 generally provide about 60% of the data required for the equipment risk evaluation. However, the remaining data needs to be extracted from the plurality of data sources 170 that include the design files, physical documents, vendor specifications and other miscellaneous data sources. Extracting the accurate information from such data sources is needed for performing a reliable criticality analysis. The data extractor 164 helps in the process of extracting the data from the data sources 170. In an example, the data extractor 164 includes a zone identifier 402 which can implement techniques such as OCR to identify zones within physical documents that have a high probability of containing a match for the required data. In an example, the zone identifier 402 can include AI elements such as classifiers that are trained to identify particular portions of each document. The determination regarding the zone having high probability can be enabled by training the zone identifier 402 on various document templates. When a zone is identified as having a high probability of matching data, the search is generally constrained to that zone. Upon zone identification, the pattern matcher 404 searches and identifies patterns within the zones that match up with the query pattern. The data validator 406 implements real-time data validation, updating missing data in the information provided by the PE system 102 or the multi-dimensional visualizations 182. The data thus extracted can be provided to the APM system 112 for evaluating the equipment risk ranking.

Figure 5:
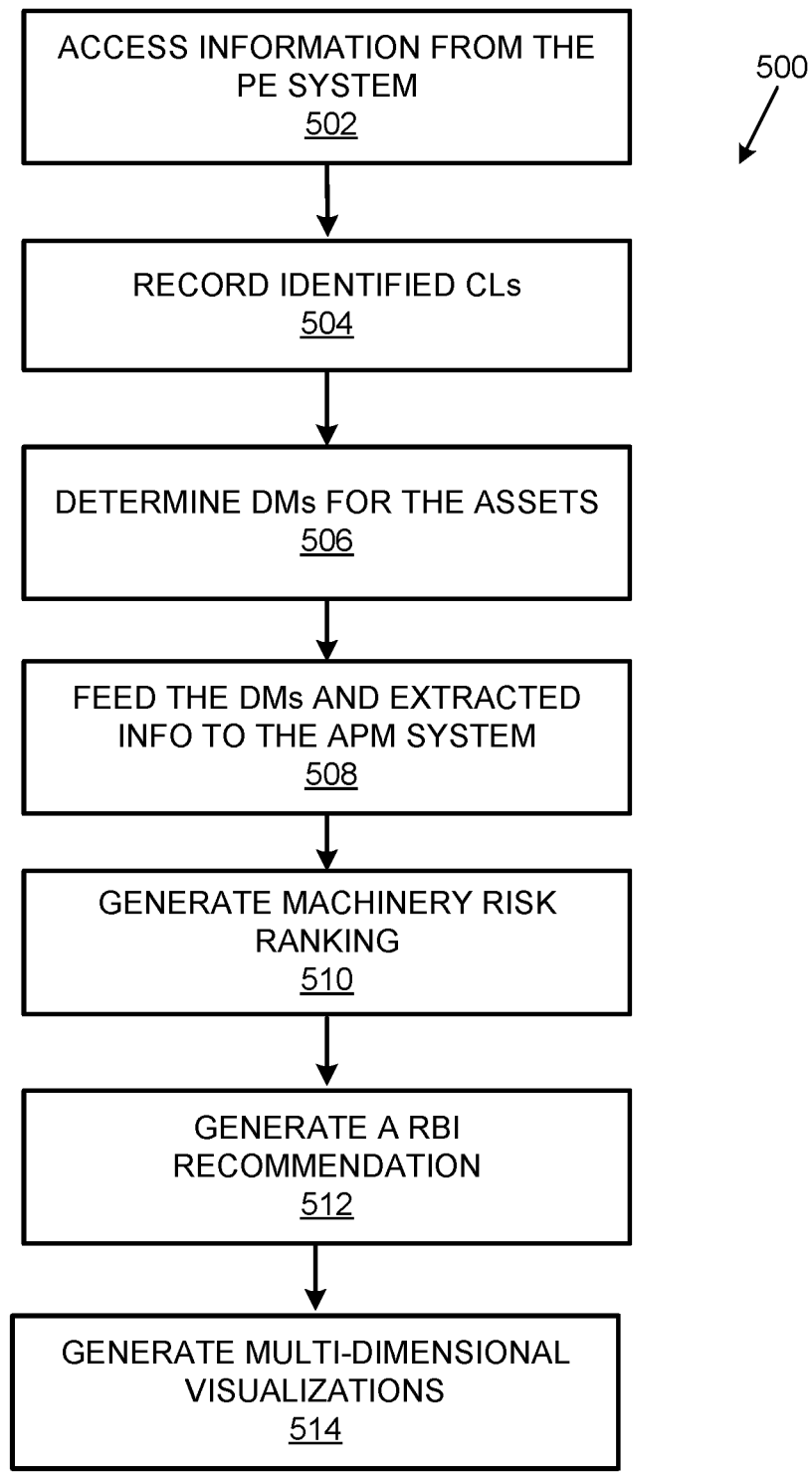
FIG. 5 shows a flowchart that details a method of monitoring risk of failure in the assets of the process plant in accordance with the examples disclosed herein.

FIG. 5 shows a flowchart 500 that details a method of monitoring risk of failure in the assets 192a-192c of the process plant 190 in accordance with the examples disclosed herein. The method begins at 502 with accessing the information from the PE system 102. Information including design data of the process plant assets, current process parameters 124, etc. are identified. Based on the information, the CLs as identified by the user are recorded, e.g., stored, at 504. The CL can be identified by the user based on the materials that make up the particular assets, the process conditions or the environment of the assets, the asset characteristics such as materials of construction, insulation type, coatings, heat tracing, whether the asset is buried, etc. At 506, the DMs 144 are determined for each of the assets 192a-192c of the plant 190 using the ML model 142 that is trained on the historical data 304. The DMs can be identified using information extracted from established corrosion/materials literature, plant specific studies and industry guidance manuals.

The DMs 144 thus identified, the CLs 122 and the asset information extracted from the plurality of data sources 170 are fed to the APM system 112 at 508 for performing the equipment risk ranking of the assets 192a-192c. The APM system 112 accesses the records created for each of the assets from the PE system 102. At 510, the APM system 112 conducts a RBI analysis for generating the equipment risk ranking which can be a combination of the probability of failure (POF) and the Consequence of Failure (COF). The equipment risk rank can be used as an Inspection Priority and can be calculated automatically by the APM system 112 which can be based on factors such as but not limited to, the DMS 122, Short Term Corrosion Rate, Long Term Corrosion Rate, the number of Inspection Activities, etc. At 512, a RBI recommendation can be generated based on the inspection priority which can be embedded into the inspection task and further included in the Inspection Strategy. At 514, the risk ranking can also be used along with the CLS 122 and the DMs 144 for generating one or more multi-dimensional visualizations 182 such as two-dimensional diagrams or three-dimensional visualizations via mobile apps.

Figure 6A:
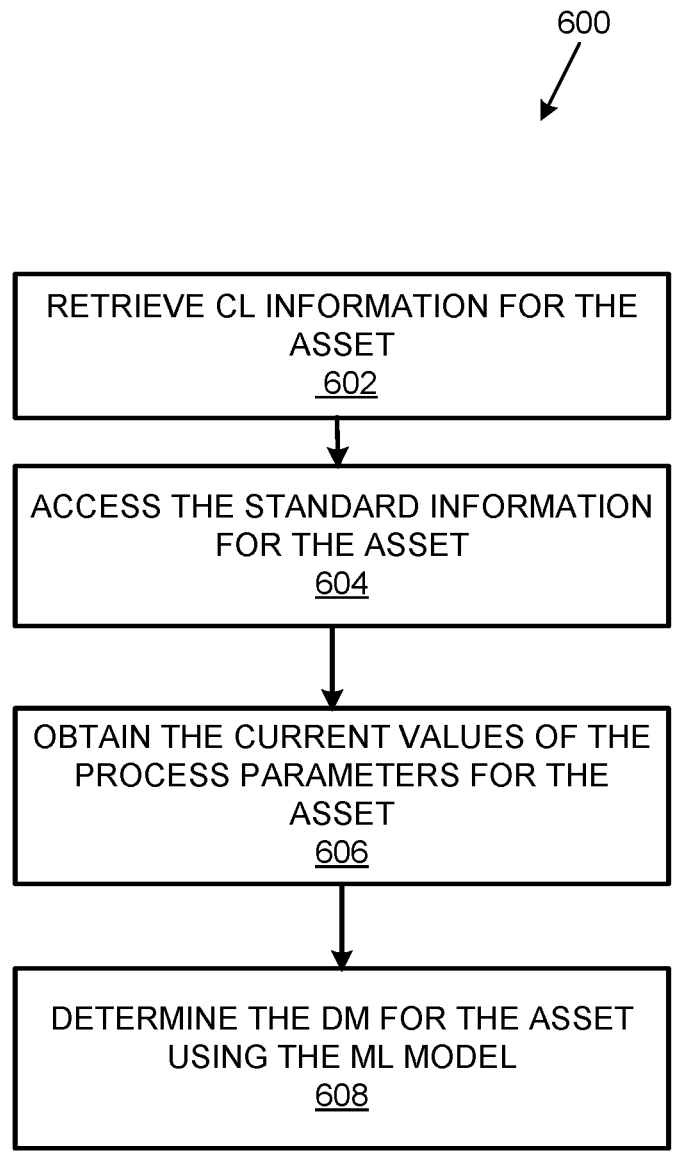
FIG. 6A details a flow chart for automatically determining a DM for an asset in accordance with the examples disclosed herein.

FIG. 6A details a flow chart for automatically determining the DM for an asset in accordance with the examples disclosed herein. The method begins at 602 wherein the CL information of the asset is retrieved. In an example, a user can evaluate the asset and identify a CL number for the asset within the PE system 102. Accordingly, the CL number may be retrieved at 602. In addition, the engineering information such as the design information, the material used to build the asset, other physical attributes of the asset e.g., size, temperature/pressure tolerance, the placement of the asset (e.g., buried), etc. can also be obtained. At 604, the industry standard information is accessed. As mentioned herein, API 571 is an example of the industry standard information that is retrieved at 604 for oil refineries. In an example, the standard information manuals can be made available in processor readable formats such as searchable pdfs, or markup documents, etc. Therefore, techniques such as pattern matching or other textual processing techniques can be employed to retrieve the standard information relevant to the asset for which the DM is being determined.

At 606, current values of the process parameters of the asset are obtained from the PE system 102. Therefore, values of parameters such as pressure, temperature or other environmental conditions that correspond to the process enabled by the asset are obtained at 606. In an example, the parameter values to be retrieved can be identified via one or more of the CL information retrieved at 602 and the standard information accessed at 604. The ML model 142 which is trained to determine the DM processes the variety of information retrieved from different data sources to provide a DM for a particular asset at 608. It can be appreciated that depending on the manner of use, an asset can be associated with more than one DM. A likelihood of the occurrence of each of the DM can be produced at 608 in case multiple DMs are identified. The ML model 142 can be trained and tested on historical data 304 which can include the various parameter data that has the corresponding DMs identified.

Figure 6B:
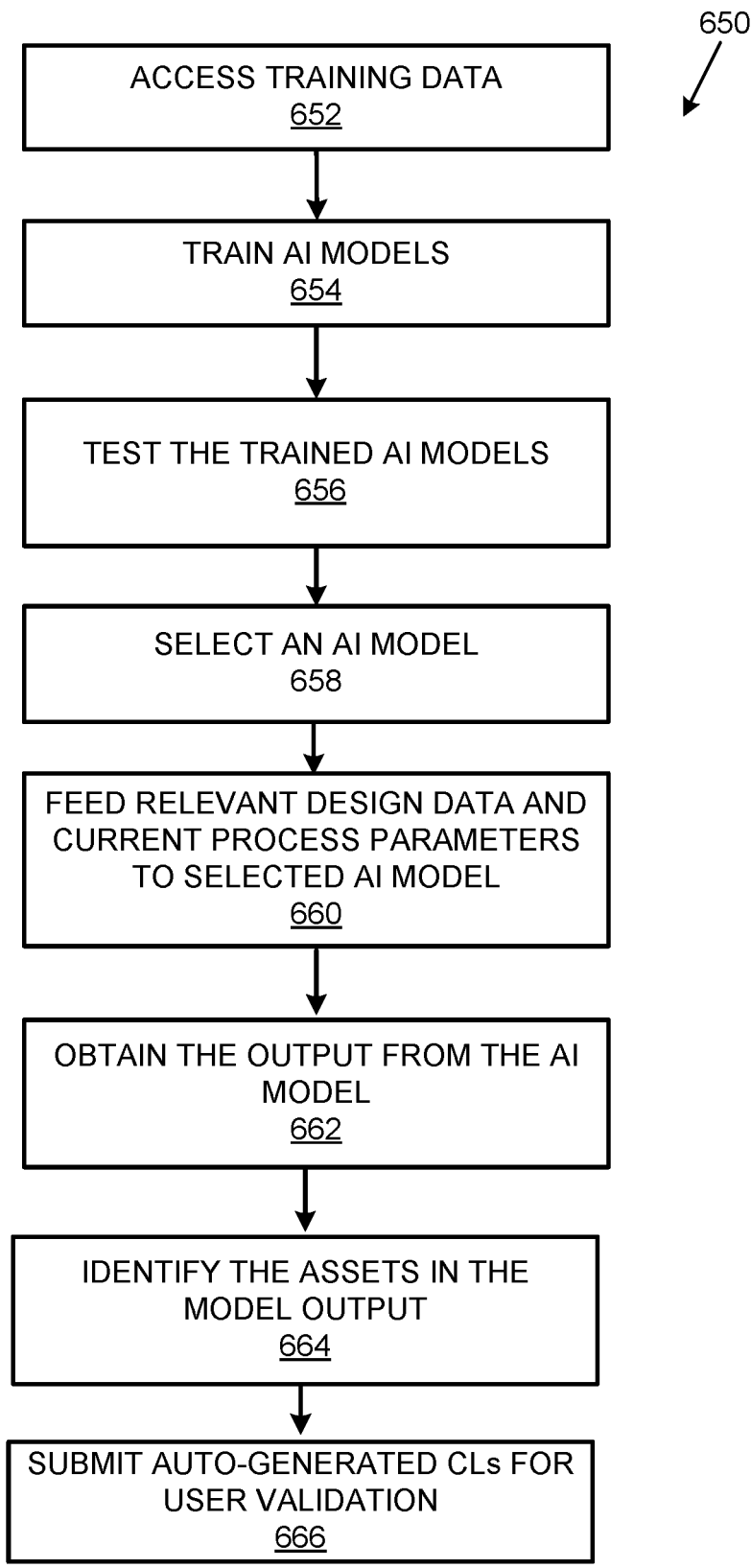
FIG. 6B details a flow chart for automatically identifying corrosion loops (CLs) for a process plant in accordance with the examples disclosed herein

FIG. 6B shows a flowchart 650 that details a method of automatically identifying CLs within plant assets in accordance with the examples disclosed herein. The method begins at 652 wherein the training data from the data sources 170 pertaining to the plant assets 192a-192c that include paper documents with P&IDs having CLs marked out, data logs from legacy systems or manual CL inputs received at the PE system 102 etc. is accessed. One or more classifiers such as random forests, SVMs, decision trees etc. are trained on the training data at 654 to classify plant assets based on their possession of similar properties. The trained models are tested at 656 and the best performing AI model is selected for CL identification at 658. At 660, the relevant design data 204 in addition to the current process parameters can be fed to the AI model 2662. The output from the AI model 2662 including one or more groups of two or more of the plant assets 192a-192c with similar properties can be obtained at 662. Each of the CLs can be identified by a unique identifier which can include one or more alphabets, numerals, special characters or combinations thereof. The groups of assets with similar properties can correspond to the various CLs identified within the plant 190. In an example, the output at 662 can be textual output wherein the assets making up the CLs are listed together. In an example, the image identifier 2664 can be engaged at 664 for identifying the assets referred to in the output at 662 on the 2D representations 202. The assets that make up each of the CLs can be marked via overlays generated in specific colors corresponding to the CLs to outline the assets in the 2D representations 202. The CLs which were auto-generated at 662 can be further submitted for user validation at 666. One or more of the textual output or the 2D representations with the overlays can be presented to the user for validation at 666. The user's input during the validation processes can be added to the training data used for training the AI model 2662 at 654.

Figure 7:
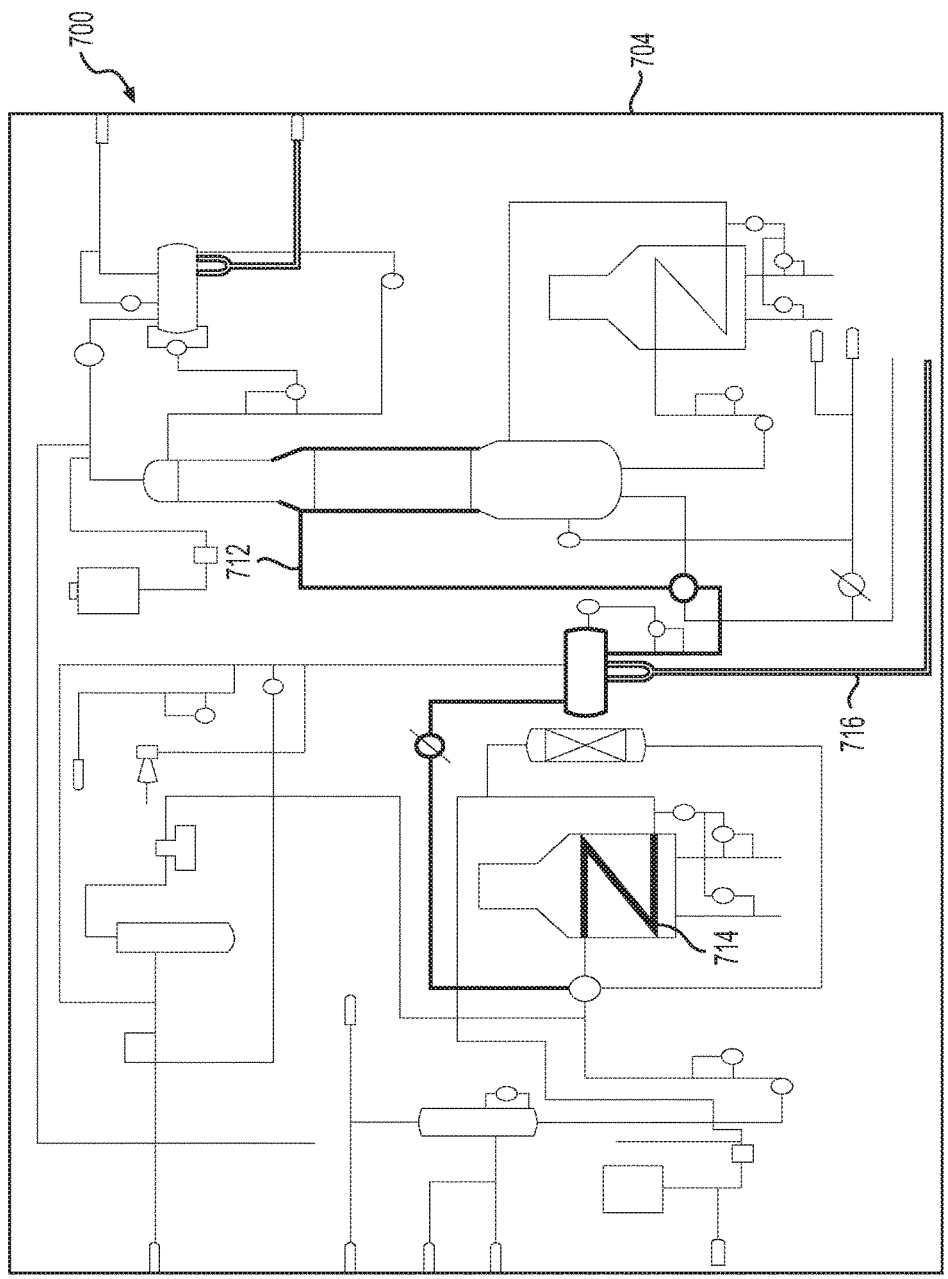
FIG. 7 shows a diagram of the assets in a plant with the corrosion loops (CLs) marked out in accordance with the examples disclosed herein.
Figure 7:
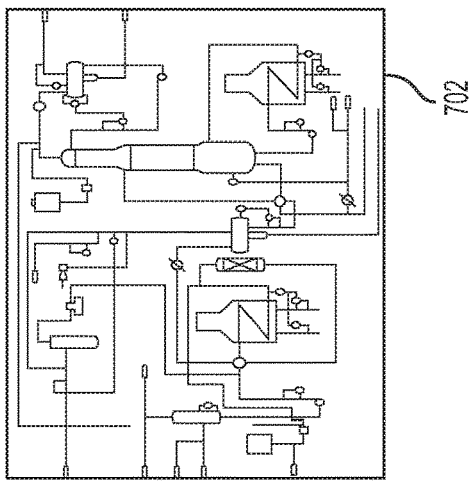

FIG. 7 shows a diagram 700 of the assets in a plant with the CLs marked out in accordance with the examples disclosed herein. The diagram 702 shows a display of the design data of the plant assets prior to the CLs being demarcated by the asset monitoring system 100. The diagram 704 shows the CLs 712, 714 and 716 that were demarcated from the assets shown in the diagram 702. Each of the CLs 712, 714 and 716 include one or more lines and other assets. Different formats can be employed to demarcate the different CLs. By way of illustration and not limitation, each CL can be marked in a different color so that the lines and assets that form the particular CL are displayed with that particular color. In the diagram 704 different CLs are depicted in black lines of different thicknesses such as 712 and 714. Similarly, different CLs such as the CL 716 can be shown with different dashes. While only three CLs are shown for brevity, it can be appreciated that each asset in the plant can be part of a CL.

Figure 8:
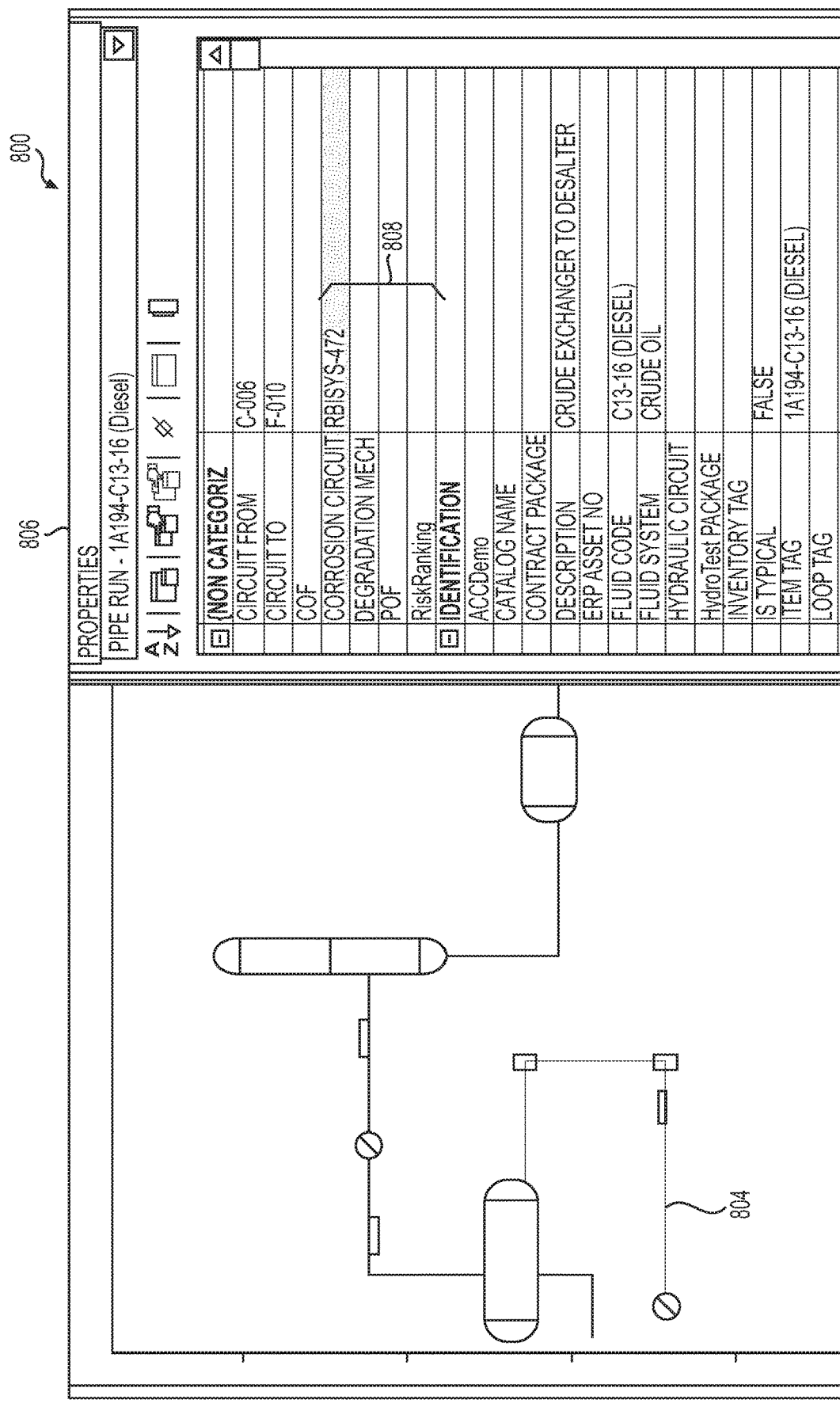
FIG. 8 shows a graphical user interface (GUI) associated with the PE system in accordance with the examples disclosed herein.

FIG. 8 shows a GUI 800 associated with the PE system 102 in accordance with the examples disclosed herein. The GUI 800 shows a two dimensional representation or particularly, a P&ID 802 showing some assets in a process plant. A CL 804 is included in the P&ID 802 and the properties 806 corresponding to an asset in the CL 804 are also displayed. The properties include data 808, such as the identification of the corrosion circuit the DM, POF and the equipment risk ranking.

Figure 9:
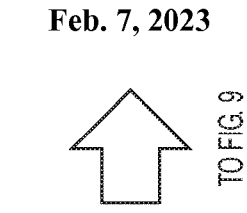
FIG. 9 shows the auto-population of data to the generated visualizations in accordance with the examples disclosed herein.
Figure 9:
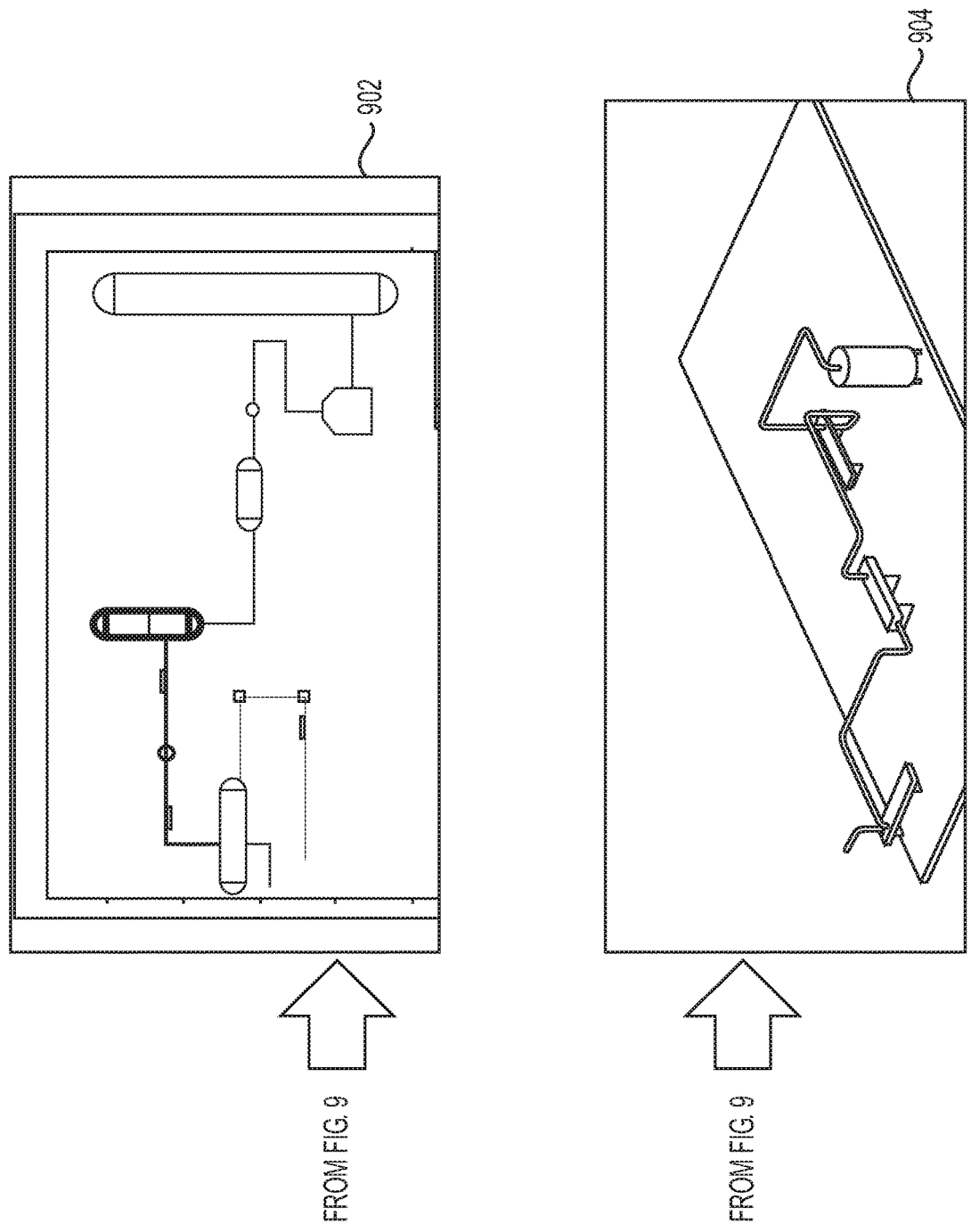

FIG. 9 shows the auto-population of the data from the engineering systems and the process of calculating the risk ranking by the APM system 112 in accordance with the examples disclosed herein. The results of this process are used for generating multi-dimensional auto visualization based on risk ranking. Auto visualization of assets by the visualization generator 108 within the asset monitoring system 100 develops a digital twin of the plant and provides a visual view of the criticality of the assets. As mentioned herein, the visualizations can be of different dimensions such as the 2D visualization 902 and the 3D visualization 904. The visualizations 902, 904 are built using the data from components such as the PE system 102, the data unit 106, etc. A GUI 910 is shown which includes the data such as asset properties that are used to build the visualizations.

Whenever the data such as the equipment risk ranking, process parameters associated with any of the assets in the visualizations 902/904 changes, the change is automatically updated to the visualizations. In an example, the changes can be updated via scheduled data transfers. In an example, the device displaying the visualizations 902/904 can automatically pull the data from the asset monitoring system 100. Displaying the equipment risk ranking enables determination of the criticality of the assets in the visualization. This can be useful for process plants that do not have a 3D model but depend on drawings to perform analysis of the states of the various assets. The visualizations can be configured to display the risk ranking, thickness or other asset attributes indicating the criticality of the assets via color codes. For example, a palette 912 including a 5×5 matrix shows the color coding of red, green and orange indicating the criticality of various assets. The visualizations use the color coding data to show the asset within the visualization 904 in the corresponding color.

Therefore, a highly critical asset facing imminent failure can be displayed in red. An asset which needs attention or maintenance and not functioning ideally per specifications can be displayed in orange. The orange coded asset also requires maintenance although it may not require the immediate attention needed for an asset being displayed in red. Assets which are functioning normally in full capacity can be displayed in green. Since the visualizations can be updated in real-time, when a maintenance routine is carried out on an asset that changes the criticality of the asset, the color in which the asset is displayed in the visualization can be automatically changed. Hence, remote supervision of the assets is enabled by the asset monitoring system 100. Moreover, TMLs are initially marked in the 3D visualizations. Integration between the 3D visualizations and the asset monitoring system 100 enables the TMLs to receive real-time data and thereby provide visual representations of the TMLs where the rate of damage is high or critical.

In an example, the 3D visualization 904 can be generated by user devices such as laptops, tablet computers, virtual reality (VR) devices, augmented reality (AR) devices or mobile phones. In fact, the asset monitoring system 100 can scale to support multiple users to view the same visualization. For example, a technician at the plant 190 can scan a quick response (QR) code of one of the assets 192a-192c in order to have a 2D or a 3D visualization of the asset generated by the visualization generator 108. The type of visualization accessed can depend on the type of user device employed for accessing the asset monitoring system 100. Accordingly, if the technician at the plant is using a mobile phone, a 2D or 3D visualization can be generated in the mobile app installed on the mobile phone. However, if the remotely located supervisor employs the AR device 186, the 3D model of the asset being worked on by the technician can be generated for display at the supervisor's location. Therefore, as the technician is working on the asset(s) to implement a recommended maintenance action, the supervisor will be able to supervise/guide the technician even as the current asset parameters of the asset are updated.

FIG. 10 illustrates a computer system 1000 that may be used to implement the asset monitoring system 100. More particularly, computing machines such as desktops, laptops, smartphones, tablets and wearables which may be used to generate or access the data from the asset monitoring system 100 may have the structure of the computer system 1000. The computer system 1000 may include additional components not shown and that some of the components described may be removed and/or modified. In another example, a computer system 1000 can sit on external-cloud platforms such as, Amazon Web Services, AZURE cloud or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the computer-readable medium 1006 may be non-transitory or non-volatile medium, such as a magnetic disk or solid-state non-volatile memory or volatile medium such as RAM. The instructions or modules stored on the computer-readable medium 1006 may include machine-readable instructions 1064 executed by the processor(s) 1002 to perform the methods and functions of the asset monitoring system 100.

The asset monitoring system 100 may be implemented as software stored on a non-transitory computer-readable medium and executed by the one or more processors 1002. For example, the computer-readable medium 1006 may store an operating system 1062, such as MAC OS, MS WINDOWS, UNIX, or LINUX, and code 1064 for the asset monitoring system 100. The operating system 1062 may be multi-user, multiprocessing, multitasking, multithreading, real-time and the like. For example, during runtime, the operating system 1062 is running and the code for the asset monitoring system 100 is executed by the processor(s) 1002.

The computer system 1000 may include a data storage 1010, which may include non-volatile data storage. The data storage 1010 stores any data used by the asset monitoring system 100. The data storage 1010 may be used to store the various multi-dimensional visualizations generated by the asset monitoring system 100, the historical data, the process parameters, etc.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An asset monitoring system comprising:
   at least one processor;
   a non-transitory processor readable medium storing machine-readable instructions that cause the at least one processor to:
   train a machine learning (ML) model on historical data associated with a process plant, the ML model being trained in determining damage mechanisms (DMs) that include causes of degradation of one or more assets of the process plant,
      wherein the ML model is trained on historical data that includes labelled data with various process parameters and corresponding DMs identified for each asset of the one or more assets of the process plant;
   receive data regarding the one or more assets of the process plant from a plurality of data sources that include at least two-dimensional diagrams of the one or more assets where the one or more assets include equipment and lines of the process plant;
   automatically identify one or more corrosion loops (CLs) based at least on design data of the one or more assets wherein each of the CLs includes at least two of the one or more assets with similar attributes and exposed to similar process conditions;

retrieve process parameters associated with each of the one or more assets within the process plant;

automatically identify, by the ML model, at least one of the DMs associated with each of the one or more assets based on the CLs and the process parameters associated with the CLs;

obtain an equipment risk ranking corresponding to each of the one or more assets based on corresponding CLs, the DMs and current process conditions of each asset where the equipment risk ranking is representative of a probability of failure of the asset; and enable generation one or more multi-dimensional visualizations of the one or more assets, wherein the multi-dimensional visualizations include overlays indicating the CLs identified among the one or more assets and the multi-dimensional visualizations display the one or more assets with a color coding representative of the equipment risk ranking of the asset.

2. The asset monitoring system of claim 1, wherein non-transitory processor readable medium stores further machine-readable instructions that cause the at least one processor to:

provide recommendations for a maintenance routine for at least one of the one or more assets based on the equipment risk ranking.

3. The asset monitoring system of claim 1, wherein the plurality of data sources include physical documents and engineering data associated with the two-dimensional diagrams.

4. The asset monitoring system of claim 1, wherein non-transitory processor readable medium stores further machine-readable instructions that cause the at least one processor to:

transform the data regarding the one or more assets from the plurality of data sources into a standard form consumable by the ML model.

5. The asset monitoring system of claim 1, wherein the instructions for enabling the identification of the CLs comprise further instructions that cause the processor to:

receive additional properties for the one or more assets for the identification of the CLs;

employ a trained AI model for identifying at least two of the one or more assets with similar properties; and automatically highlight the at least two assets as a suggested corrosion loop within two dimensional diagrams included in the multi-dimensional visualizations.

6. The asset monitoring system of claim 1, wherein the ML model includes support vector machines (SVM).

7. The asset monitoring system of claim 1, wherein the ML model includes random forests.

8. The asset monitoring system of claim 1, wherein the instructions for generating one or more multi-dimensional visualizations of the one or more assets comprise further instructions that cause the processor to:

receive a quick response (QR) code affixed to at least one of the one or more assets being worked on by a technician; and enable generation of a three dimensional (3D) visualization of the at least one asset as one of the one or more multi-dimensional visualization via a mobile app at a remote geographic location from the plant.

9. The asset monitoring system of claim 8, wherein the instructions to generate one or more multi-dimensional visualizations of the one or more assets comprise further instructions that cause the processor to:

receive user input tracking the work of the technician on the at least one asset on the multi-dimensional visualization; and update a data repository of the asset monitoring system including asset parameters of the at least one asset from data regarding the one or more assets with the user input; and provide further user input from the mobile app to the technician via one of the one or more multidimensional visualizations.

10. The asset monitoring system of claim 9, wherein the instructions to generate one or more multi-dimensional visualizations of the one or more assets comprise further instructions that cause the processor to:

indicate thickness monitoring locations (TMLs) on the one or more assets that include pressure vessels and piping where thickness measurement inspections (TMIs) are conducted.

11. The asset monitoring system of claim 1, wherein the instructions to generate one or more multi-dimensional visualizations of the one or more assets comprise further instructions that cause the processor to:

update at least one of the multi-dimensional visualizations with real-time process parameters where the at least one multi-dimensional visualization represents a current state of the one or more assets in the process plant.

12. A method of monitoring assets of a process plant comprising:

training a machine learning (ML) model on historical data associated with the process plant, the ML model being trained to determine damage mechanisms (DMs) corresponding to the assets of the process plant, wherein the ML model is trained on historical data that includes labelled data with various process parameters and corresponding DMs identified for each asset of the assets of the process plant;

receiving data regarding the assets of the process plant from a plurality of data sources associated with the plant, the data regarding the assets includes design data of the assets and process parameter values of the assets;

transforming the data regarding the assets into a standardized format;

automatically identifying one or more corrosion loops (CLs) among the assets, wherein each of the one or more CLs includes a section of one or more of the assets that share common attributes;

adding one or more properties to the assets, the added properties including at least an identification of corresponding CLs of the assets;

determining, using the trained ML model, the DMs corresponding to each of the assets, wherein the DMs include causes of degradation of the assets;

obtaining an equipment risk ranking for each of the assets based at least on the CLs, the DMs and the data associated with each of the assets;

generating a recommended maintenance action for one or more of the assets based on corresponding equipment risk rankings for the assets; and generating one or more multi-dimensional visualizations of the assets where the multi-dimensional visualizations include overlays indicating the one or more CLs identified among the assets and the multi-dimensional visualizations are color coded based on the equipment risk rankings for each of the assets.

13. The method of claim 12, wherein the trained ML model implements support vector machines (SVMs).

14. The method of claim 12, further comprising:
updating the multi-dimensional visualizations with changes in one or more of the equipment risk rankings and the process parameter values of the assets.

15. The method of claim 14, wherein generating the multi-dimensional visualizations further comprises:
generating at least one two dimensional diagram of the assets with the CLs in the plant marked out on the two dimensional diagram.

16. The method of claim 14, wherein automatically identifying the CLs further comprises:
feed the data regarding the assets and current process parameters to an AI model trained to classify assets with similar properties; and
obtain an output from the AI model with the assets grouped into one or more of the CLs based on the similar properties, wherein each of the CLs has a unique identifier.

17. The method of claim 13, wherein automatically identifying the CLs further comprises:
identify, on the multi-dimensional visualizations of the process plant using image recognition, the assets grouped into the one or more of the CLs; and
demarcate respective group of assets belonging to each of the CLs in a respective color.

18. A non-transitory computer-readable storage medium comprising machine-readable instructions that cause a processor to:
train a machine learning (ML) model on historical data associated with a process plant, the ML model being trained in determining damage mechanisms (DMs) that include causes of degradation of assets of the process plant,
wherein the ML model is trained on historical data that includes labelled data with various process parameters and corresponding DMs identified for each asset of the assets of the process plant;
receive data regarding the assets of the process plant from a plurality of data sources where the plurality of data sources include at least two-dimensional diagrams of the assets, the assets including equipment and lines of the process plant;
automatically identify one or more corrosion loops (CLs) based at least on design data of the assets wherein each of the one or more CLs includes one or more of the assets with similar attributes and exposed to similar process conditions;
retrieve process parameters associated with each of the assets within the process plant;
automatically identify, by the ML model, at least one of the DMs associated with each of the assets based on the CLs and the process parameters associated with the CLs, wherein the DMs include causes of degradation of the assets;
obtain an equipment risk ranking corresponding to each of the assets based on corresponding CLs, the DMs and current process conditions of each asset where the equipment risk ranking is representative of a probability of failure of the asset; and
enable generation one or more multi-dimensional visualizations of the assets, wherein the multi-dimensional visualizations include overlays indicating the CLs identified among the one or more assets and the multi-dimensional visualizations display the assets with a color coding representative of the equipment risk ranking of the asset.

19. The non-transitory computer-readable storage medium of claim 18, further comprising instructions that cause the processor to:
generate a recommended maintenance action for one or more of the assets based on corresponding equipment risk rankings for the assets.

20. The non-transitory computer-readable storage medium of claim 18, wherein the instructions to display each of the assets with a color coding further comprising instructions that cause the processor to:
enable display of each of the assets in one of red, orange or green colors representative of a corresponding criticality of the assets based on the equipment risk rankings.

* * * * *